Sept. 28, 1948.  H. W. H. BETH  2,450,226

PULPSTONE

Filed May 18, 1946

Inventor

Hugo W. H. Beth

By Geo. C. Crompton Jr.

Attorney

Patented Sept. 28, 1948

2,450,226

UNITED STATES PATENT OFFICE 2,450,226

PULPSTONE

Hugo W. H. Beth, Worcester, Mass., assignor to Norton Company, Worcester, Mass., a corporation of Massachusetts Application May 18, 1946, Serial No. 670,663

2 Claims. (Cl. 51—206.4)

The invention relates to pulpstones, and with regard to its more specific features, to pulpstones for grinding long logs.

One object of the invention is to provide a long pulpstone, for example of the order of eight feet in length (length here meaning the axial dimension). Another object is to provide a strong pulpstone of considerable length. Another object is to provide a pulpstone and mount of the size and weight necessary to grind long logs, of simple and practical construction and which is capable of long continued and dependable operation. Another object of the invention is to provide a construction for a long pulpstone which is economical to manufacture. Another object is to provide driving means for a pulpstone which is capable of absorbing a greater amount of horse power than conventional driving means.

Another object of the invention is to provide a long pulpstone capable of being used in high production grinding without developing excessive stresses and pressures at the flanges and upon the concrete center. Another object is to provide a pulpstone which is reinforced axially as well as radially. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

Figure 1:
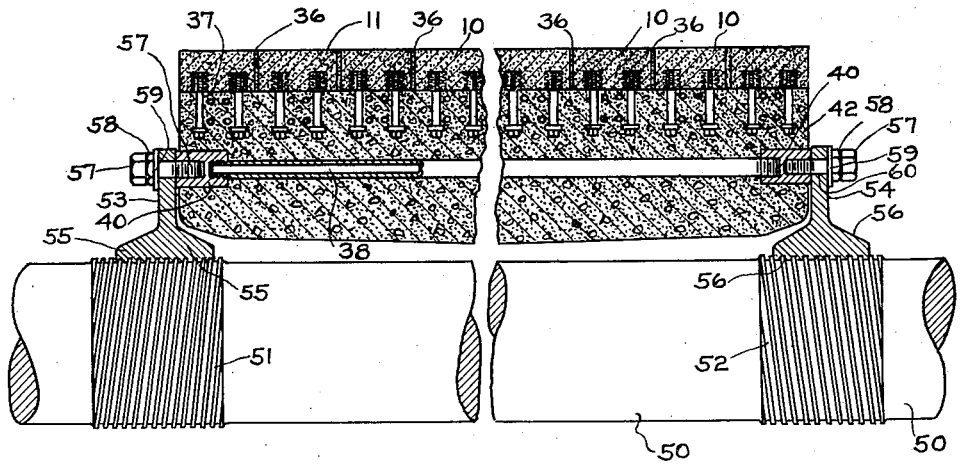

In the accompanying drawings, in which is shown one of various possible embodiments of the mechanical features of this invention, Figure 1 is an axial sectional view of one half of a pulpstone constructed in accordance with the invention, together with the driving flanges and the driving shaft.

Figure 2:
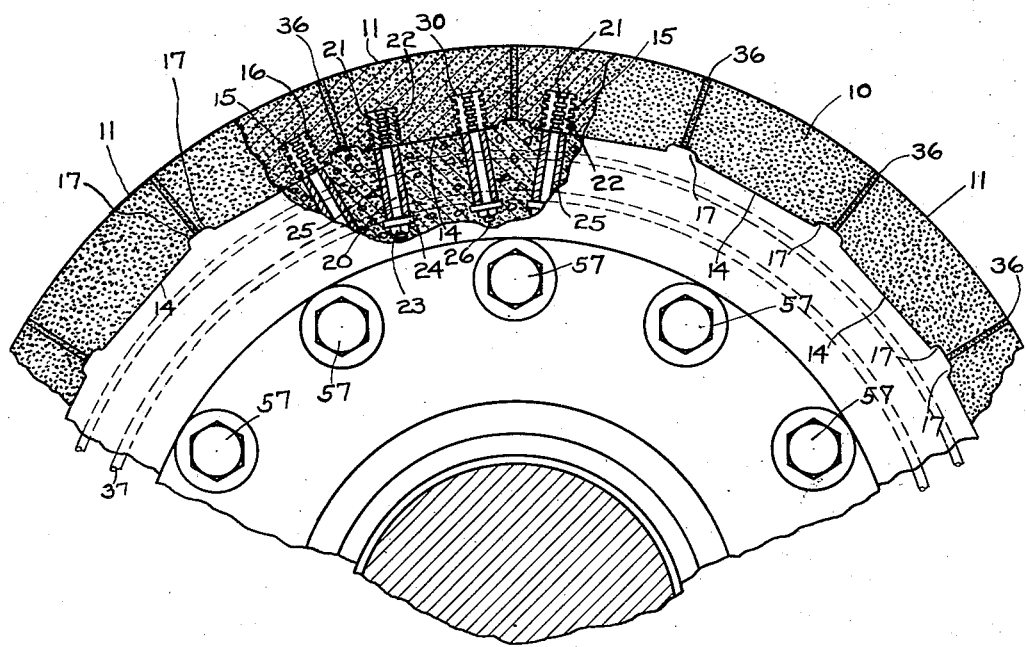

Figure 2 is an end elevation of a portion of the pulpstone, with part thereof shown in cross section, all on a larger scale than Figure 1.

As conducive to a clearer understanding of the present invention, it is noted that pulpstones are customarily driven by flanges on right and left hand threads on the driving shaft, such construction compressing the flanges against the ends of the pulpstone thus providing pressure for frictional driving. The pressure is a function of the power factor as will be readily understood. Pulpstones now used are commonly no more than five feet in axial dimension, usually less. In such stones the power factor is not great enough to set up pressure which could crush the stones.

According to the present invention, however, it is contemplated that stones eight and even nine feet long will be constructed. If flange friction were the sole driving means, very large pressures could be created. The situation is aggravated, moreover, by the differential expansion of the stone and the steel shaft which in the case of a long steel shaft assumes serious proportions.

As described in U. S. Patent No. 2,141,608, I provide a number of blocks 10 of bonded abrasive material. Each block of bonded abrasive material is composed of any desired type of abrasive such as silicon carbide or fused alumina, the latter being preferred, bonded together with a suitable bonding material, vitrified ceramic bond being preferred. Each block 10 is, therefore, formed of a mixture of clay or frit with abrasive, suitably plasticized as by the provision of a suitable amount of plastic clay and the addition of water, then molded in a suitable mold and pressed under high pressure to cause the block to have sufficient "green" strength for handling. After each block 10 comes from the mold, it has an outer cylindrical surface 11 and an under surface 14 which may be a plane surface. While the block 10 is in a "green" state, I bore four holes 15 therein, each hole 15 having numerous grooves 16 in its side walls. I then form reentrant grooves 17 at the ends of the surface 14. Each groove 17 is adjacent to a corresponding groove 17 in the adjacent block.

The blocks 10 are then fired in a kiln and the shape thus becomes permanent and the material is thereby converted to vitrified bonded abrasive material. I provide a quantity of bolts 20 having heads 21 with grooves 22. I further provide an equal quantity of nuts 23, washers 24 and sleeves 25. I place the sleeves 25 on the bolts 20 abutting the heads 21. I then place the washers 24 against the ends of the sleeves 25, place the nuts upon the outer threaded ends 26 of the bolts 20 and tighten the nuts 23. Thereby the bolts 20 are placed under initial tension.

I then place in each hole 15 a head 21 of a bolt 20 and fill the space with a suitable self setting cement 30 such as a mixture of Portland cement and iron fillings. This has excellent holding power. Each block 10 thus far has four bolts 20 projecting therefrom, each bolt being encased by a sleeve 25 and having attached to it a washer 24. Each bolt 20 is under initial tension such that a considerable force is needed to move the head 21 away from the washer 24 by even a very slight distance. Each bolt 20 is securely locked to its block 10 by reason of the fact that the cement 30 interlocks with the grooves 16 in the block 10 and also interlocks with the grooves 22 in the head 21.

I now arrange the blocks 10 in rows to form a hollow cylinder of outside diameter equal to that of the finished pulpstone.

Between the blocks I place suitable filler material 36 such as that described in U. S. Patent No. 2,054,771. The blocks are clamped together and the whole assembly is placed in an oven to bake the material 36. Inside this hollow cylinder after it is removed from the oven, I place cages formed of hoops of steel 37 spaced apart axially by metal clips, not shown. This construction is the same as that described in Patent No. 2,141,608 and preferably there are a plurality of cages made of hoops, for example two as shown, the hoops of one cage being of a different diameter from the hoops of another cage. The cages serve to reinforce the stone against centrifugal force and other radial forces.

In the manufacture of the stone I use a bottom mold plate and a pair of tapered mold sleeves. The mold sleeves are placed in the center of the cylinder of blocks, one on top of the other with their small ends together, and the bottom sleeve rests upon the bottom mold plate. All three of these molds parts are located coaxial with the cylinder of blocks and are suitably braced; concrete can now be poured to form the center of the stone, and after the concrete has set, the mold parts are removed. As thus far described, except for the greater length of the ultimate pulpstone, the construction and method of construction is the same as that described in Patent No. 2,141,608 referred to, but so far as the present invention is concerned this construction may be varied.

According to the present invention there is additionally provided means for reinforcing the concrete center of the stone in an axial direction. This reinforcement is capable of withstanding compressive forces as well as tensioning forces. As shown in Figure 1, I provide a plurality of heavy pipes or rods 38 with screw threaded ends and I arrange these outside the mold sleeves parallel to each other and preferably on a circle coaxial with the assembly. At each end of each pipe 38 a heavy metal lug 40, with a tapped hole at each end, is screwed onto the pipe. The pipes 38 with their lugs 40 are all placed in position before the concrete is poured. They may be held in place by templates, the bottom mold plate serving as one template. The concrete which may consist of a suitable mixture of Portland cement, sand and trap rock, is now poured inside the cylinder of blocks 10 and allowed to set. The surface of the upper end is shaped to be the same as that of the lower end before the concrete has set. The mold and clamps are removed and the stone is trued, dressed and sided. The pulpstone per se is now finished.

The pulpstone will usually be mounted upon a driving shaft 50 which has a left hand screw thread 51 and a right hand screw thread 52. For mounting pulpstones of this invention it is highly desirable that the pitch of these threads be long. I provide large flanges 53 and 54 with hubs 55 and 56. Flanges 53 and 54 are identical and the hubs 55 and 56 are identical except that the hub 55 has a left hand internal thread and the hub 56 has a right hand internal thread. The threads of these hubs 55 and 56 fit the threads 51 and 52. Bolts 57 with lock nuts 58 and washers 59 extend through holes 60 in the flanges 53 and 54 and into the tapped holes in the outside of the lugs 40, thus holding the pulpstone upon the shaft.

In order to assemble the pulpstone with the flanges 53, 54 on the shaft 50, the shaft is dismounted from its journal at one end and the flange nearest that end is removed, the other one being in place. Then the stone is placed on the shaft and the bolts 57 are inserted and tightened. Now the flange that was removed is replaced and screwed up to the stone whereupon the bolts 57 are inserted and tightened. Then the journal can be replaced. Then the shaft 50 is turned slightly while holding the stone to set up the flanges 53, 54, and the bolts 57 are retightened.

When the stone is used the opposite threads 51, 52 force the flanges 53, 54 against the stone but since the flanges cannot move further than shown, the stone is driven by the rotating shaft. This action causes a pressure of each flange against the stone. However the pressure is an inverse function of the length of the pitch of the threads 51, 52, and since the pitch is large, the pressure will not be too great despite the fact that the other function, which is the total horse power absorbed in terms of driving couple is large in the case of this long stone. But furthermore the compressive thrust is taken by the heavy pipes 38 so that the concrete is not crushed or fractured. Thus the pulpstone of the invention is able to grind pulp at the same rate as other pulpstones despite the fact that its greater length requires more horsepower input. And this is achieved while retaining the advantages of the screw thread drive such as lack of vibration, elimination of broken keys and less breaking of the driving shaft due to detailed fracture starting at a spline.

Furthermore, the ratcheting action due to slippage of the flanges where the drive is frictional is eliminated by the positive drive provided by the invention with consequent elimination of difficulty in unscrewing the flanges to remove the pulpstone. In a pulpstone and mounting according to the present invention the flange will not get tighter whereas in former construction the flanges would frequently get so tight they would freeze to the shaft. The reason why the flanges would get tighter and tighter in former stones is that since the pressure had to be great enough to drive the stone, it would not loosen when the motor stopped and the log pressure was released. But with the construction of the present invention, since the tightening of the flanges does not provide clamping pressure enough to drive the stone, the inertia of the stone will occasionally loosen the flanges to relieve the pressure.

It will thus be seen that there has been provided by this invention a pulpstone in which the various objects hereinabove set forth together with many thoroughly practical advantages are successively achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A pulpstone comprising a plurality of blocks of bonded abrasive material arranged to form a hollow cylinder, a concrete core inside of said cylinder, means securing said blocks to said concrete core, a plurality of rods parallel to the axis of the cylinder embedded in the concrete core at equal distances from the axis of the core, screw threads on the outside of each of said rods at the ends thereof, and heavy metal lugs having tapped holes at each end screwed upon said rods at each end and said lugs being embedded in the concrete core just inside the end faces thereof, the outer tapped holes of the lugs being uncovered whereby bolts may be screwed into the lugs to hold and drive the pulpstone.

2. A pulpstone with driving flanges assembly comprising a plurality of blocks of bonded abrasive material arranged to form a hollow cylinder, a concrete core inside of said cylinder, means securing said blocks to said concrete core, a plurality of rods parallel to the axis of the cylinder embedded in the concrete core at equal distances from the axis of the core, screw threads on the outside of each of said rods at the ends thereof, heavy metal lugs having tapped holes at each end screwed upon said rods at each end and said lugs being embedded in the concrete core just inside the end faces thereof, a pair of annular metal flanges, screw threads on the insides of the flanges, one right hand and one left hand, for mounting the flanges on a pulpstone driving shaft which has right and left hand threads spaced apart, there being a plurality of holes near the periphery of each flange in such geometric arrangement as to match the outer tapped holes of the lugs, and bolts extending through the holes in the flanges and into the tapped holes in the lugs to hold and drive the pulpstone when it is mounted on the driving shaft with the flanges screwed onto the right hand and left hand threads of the driving shaft.

HUGO W. H. BETH.

REFERENCES CITED

The following references are of record in the file of this patent:

UNITED STATES PATENTS

| Number | Name | Date |
| --- | --- | --- |
| Re. 19,678 | Benner, et al. | Aug. 27, 1935 |
| 2,141,608 | Larsson | Dec. 27, 1938 |
| 2,219,398 | Rickard, et al. | Oct. 29, 1940 |